United States Patent
Lambert (10) Patent No.: US 10,681,906 B2
(45) Date of Patent: Jun. 16, 2020

(54) INVASIVE WEED SEED REMOVAL SYSTEM

(71) Applicant: Phillip S. Lambert, Lakeside, CA (US)

(72) Inventor: Phillip S. Lambert, Lakeside, CA (US)

( * ) Notice: Subject to any disclaimer, the term of this patent is extended or adjusted under 35 U.S.C. 154(b) by 305 days.

(21) Appl. No.: 15/836,519

(22) Filed: Dec. 8, 2017

(65) Prior Publication Data

US 2019/0174740 A1     Jun. 13, 2019

(51) Int. Cl.
*A01M 21/02* (2006.01)
*A01D 43/077* (2006.01)
*A01D 43/063* (2006.01)
*A01D 34/412* (2006.01)

(52) U.S. Cl.
CPC ........... *A01M 21/02* (2013.01); *A01D 34/412* (2013.01); *A01D 43/063* (2013.01); *A01D 43/077* (2013.01)

(58) Field of Classification Search
CPC . A01M 21/02; A01M 21/00; A01G 3/00–088; A01G 2003/005; A01G 20/47; A01D 34/412; A01D 34/416; A01D 34/863; A01D 34/42; A01D 34/46; A01D 34/90; A01D 34/835; A01D 34/84; A01D 34/52; A01D 34/47; A01D 34/53; A01D 43/063; A01D 43/077; A01D 45/30; A01D 46/087; A01D 46/10
See application file for complete search history.

(56) References Cited

U.S. PATENT DOCUMENTS

| | | | | |
|---|---|---|---|---|
| 1,665,155 A | * | 4/1928 | Yerger | A01G 3/0535 30/240 |
| 2,796,715 A | * | 6/1957 | Meltzer | A01D 34/04 56/17.2 |
| 2,841,946 A | * | 7/1958 | Sutherland | A01F 29/095 56/289 |
| 2,848,808 A | * | 8/1958 | Zifferer | A01D 34/84 30/124 |
| 4,512,143 A | * | 4/1985 | Jimenez | A01D 34/001 56/16.7 |
| 4,587,800 A | * | 5/1986 | Jimenez | A01G 3/062 56/16.7 |
| 4,964,472 A | * | 10/1990 | Cleworth | A01B 1/16 111/7.2 |

(Continued)

FOREIGN PATENT DOCUMENTS

GB    2312821 A * 11/1997 ............. A01D 34/86

*Primary Examiner* — Robert E Pezzuto
*Assistant Examiner* — Adam J Behrens
(74) *Attorney, Agent, or Firm* — Richard D. Clarke (57) ABSTRACT

An Invasive Weed Seed Removal System, and a method are disclosed providing an invasive weed seed removal device including a weed seed removal nozzle in combination with a vacuum and a venturi effect cutting blade configuration, which acts to cut and vacuum invasive weed seed pods, thereby effectively and economically removing them from the environment before the weed seeds reach the ground, whereby the annual cycle of invasive weed growth is broken, and areas of land are cleared of invasive weeds to enable native plants to grow and thrive. The Invasive Weed Seed Removal System can be configured as a hand-held unit, a backpack mounted unit, a lawn mower type unit and a heavy equipment type tractor attachment, to enable several methods of controlled cutting and removal of the seed pods of invasive weeds and noxious imported grasses, by adjusting the height of the cutting and vacuum nozzle.

20 Claims, 5 Drawing Sheets

(56) References Cited

U.S. PATENT DOCUMENTS

| | | | | |
|---|---|---|---|---|
| 5,372,002 | A * | 12/1994 | Collicutt | A01D 45/30 |
| | | | | 56/128 |
| 5,402,627 | A * | 4/1995 | Trompler | A01D 34/90 |
| | | | | 56/12.7 |
| 5,588,289 | A * | 12/1996 | Wilson | A01G 3/0535 |
| | | | | 30/124 |
| 5,862,595 | A * | 1/1999 | Keane | A01D 34/90 |
| | | | | 30/124 |
| 6,195,897 | B1 * | 3/2001 | Eslambolchi | G02B 6/4497 |
| | | | | 30/124 |
| 6,665,941 | B1 * | 12/2003 | Teeple | A01D 34/84 |
| | | | | 30/276 |
| 8,914,981 | B1 * | 12/2014 | Paez | A01M 21/02 |
| | | | | 30/124 |
| 9,258,943 | B1 * | 2/2016 | Ruger | A01D 43/077 |
| 9,526,205 | B1 * | 12/2016 | Cheng | A01D 34/416 |
| 9,807,943 | B1 * | 11/2017 | Black | A01G 3/0535 |
| 10,251,345 | B2 * | 4/2019 | Black | A01G 3/08 |
| 10,375,883 | B2 * | 8/2019 | Zerbarini | A01D 34/46 |
| 2003/0061793 | A1 * | 4/2003 | Wetzel | A01D 34/43 |
| | | | | 56/12.7 |
| 2008/0110026 | A1 * | 5/2008 | Marcoe | A01G 20/47 |
| | | | | 30/124 |
| 2008/0127621 | A1 * | 6/2008 | Bovo | A01D 43/063 |
| | | | | 56/12.9 |
| 2010/0146794 | A1 * | 6/2010 | Marcoe | A01G 20/47 |
| | | | | 30/124 |
| 2014/0345241 | A1 * | 11/2014 | Alessi | A01D 45/30 |
| | | | | 56/14.7 |

* cited by examiner

INVASIVE WEED SEED REMOVAL SYSTEM

FIELD OF THE INVENTION

An Invasive Weed Seed Removal System, and a method for making an Invasive Weed Seed Removal System are disclosed. More particularly, an invasive weed seed removal device is provided including a weed seed removal nozzle which works in conjunction with a combination vacuum and a venturi effect cutting blade configuration, to cut and vacuum invasive weed seed pods, thereby effectively and economically removing them from the environment before the weed seeds reach the ground, whereby the annual cycle of invasive weeds is broken, and areas of land are cleared for native plants to grow and thrive. The invasive Weed Seed Removal System can be configured as a hand-held unit, a backpack unit and a tractor attachment, to enable several methods of controlled cutting and removal of the seed pods of invasive weeds and noxious imported grasses and other plants, by adjusting the height of a unique cutting and vacuum nozzle.

BACKGROUND OF THE INVENTION

Vast areas of the country have been inundated with imported invasive species of grasses and weeds that take over the natural plant life. The solution to the problem is simply to cut and remove the extended stems holding the seed pods of invasive plants to retard future growth without destroying the low-lying vegetation. During the dry seasons the dry areas along the road sides are responsible for many fires.

The Invasive Weed Seed Removal System has been designed to eliminate the seeds produced by unwanted vegetation to reduce or eliminate future seed germination of such undesirable species. It is most effective in the elimination of seed production of a wide variety of imported invasive species of grasses. This method of controlling and eliminating these threats has the least impact on nature's natural environment.

Plants are being moved around the globe like never before. A few will become invasive in their new environments, harming the environment and economy. Climate change increases the challenge of stopping the spread of invasive plants. Now is the time to support strategies aimed at addressing invasive plants.

Plant invasions are widely recognized as significant threats to biodiversity conservation worldwide. One-way invasions can affect native ecosystems is by changing fuel properties, which can in turn affect fire behavior and, ultimately, alter fire regime characteristics such as frequency, intensity, extent, type, and seasonality of fire. If the regime changes subsequently promote the dominance of the invaders, then an invasive plant-fire regime cycle can be established. As more ecosystem components and interactions are altered, restoration of pre-invasion conditions becomes more difficult. Restoration may require managing the fuel conditions, fire regimes, native plant communities, and other ecosystem properties in addition to the invaders that caused the changes in the first place. Weeds cost Australian farmers around a $4 billion every year and they are likely to do a similar amount of damage to the environment.

Estimated Annual Cost of Invasive Plant Work just in the State of California include:
Federal agencies $21M
Utilities $2M
Nonprofit organizations $3M
Land trusts and conservancies $10M
County agriculture departments $6M
State agencies $26M
Regional Parks and Open Space Districts $4M
Resource Conservation Districts $10 M Grasses are one of the most abundant floras on all continents except Antarctica. Their divergence is estimated to have taken place 200 million years ago. Humans have intentionally and unintentionally introduced these species to North America through travel and trade. On the North American plains, prairies, grasslands, and meadows at least 11% of grasses are non-native. North America is considered a hotspot for many invasive plant species of grasses, which threatens all of the endangered native grass species and potentially threatens other grass species. Conservation tactics and management policies can help prevent invasive species from taking over and driving native North American plants to extinction

*Bromus tectorum*, also known as Cheatgrass or drooping brome is an erect-stemmed annual grass that grows to about 8 to 25 inches in height. *B. tectorum* is a grass native to Europe, south Western Asia and Northern Africa, that has become invasive in many other areas, and is a rapidly growing problem in North America. *Bromus tectorum* or Cheatgrass has the ability to draw down soil moisture and nutrients to very low levels, making it difficult for other species to compete. An increased cycle of fires favors annual species at the expense of many perennials. Due to its tendency to mature early and then dry out, it gains a competitive advantage through the promotion of fire. It is an agricultural, nursery and orchard pest. The seeds can germinate in the fall or in the spring; fall germination is generally more common. *B. tectorum* has a fibrous root system that is finely divided. When a seed germinates in the fall, the developing root system is able to expand over the winter, giving the plant an increased ability to exploit available water and nutrients in the spring.

Cheatgrass causes economic damage in many ways in the United States, including creating wildfire danger and crop destruction. The impact of Cheatgrass is estimated that as few as 100 plants/m$^2$ of *Bromus tectorum* may reduce winter wheat production by 27-36%, making *B. tectorum* a major problem in winter cereal production in North America. *B. tectorum* infests an estimated 5.7 million hectares of cropland in the western USA and control measures cost US $350 million dollars annually. Wildfires fueled by *B. tectorum* are also a significant economic cost. For example, in the state of Nevada, during a 10-day period in 1999, 0.64 million hectares of rangeland burned in wildfires largely fueled by *Bromus tectorum*. It cost US $38 million to suppress these fires and US $42 million in emergency restoration efforts on the burned area. Similar wildfire events are repeated in various portions of the Intermountain Area, USA annually.

Although some ecosystems rely on naturally occurring fires to regulate growth, some other ecosystems suffer from too much fire, such as the chaparral in southern California and lower elevation deserts in the American Southwest. The increased fire frequency in these ordinarily fire-dependent areas has upset natural cycles, damaged native plant communities, and encouraged the growth of non-native weeds. Invasive species, such as *Lygodium microphyllum* and *Bromus tectorum*, can grow rapidly in areas that were damaged by fires. Because they are highly flammable, they can increase the future risk of fire, creating a positive feedback loop that increases fire frequency and further alters native vegetation communities.

Looking at vegetation growing within roughly half a mile of structures can be very dangerous. Exotic grasses that often sprout in areas cleared of native habitat like chaparral could be more of a fire hazard than the shrubs. Research has found that homes that were surrounded mostly by grass actually ended up burning more than homes with higher fuel volumes like shrubs. In January 2005 a new California state law became effective that extended the defensible space clearance around homes and structures from 30 feet to 100 feet. Proper clearance to 100 feet dramatically increases the chance of your house surviving a wildfire. This defensible space also provides for firefighter safety when protecting homes during a wild land fire.

Buffelgrass poses an urban fire risk in Tucson where the invasive, a highly flammable plant is spreading like a weedy plague across the Tucson urban area choking out native plants and posing a fire threat to homes and other property. Buffelgrass provides a unique challenge to firefighters. It burns extremely hot and has a very rapid rate of spread. Flame lengths of 15 to 25 feet are typical.

Several Central Oregon fires have begun with sparks from cars hitting dry roadside grasses, including the County Line 2 fire, which burned more than 67,000 acres on the Warm Springs Indian Reservation in 2015. During the summer the invasive weed commonly known as Cheatgrass comes back and taller than ever, leaving federal and county forestry officials concerned that the outbreak can lead to more wildfires.

The grasses mentioned above have barbed seeds that are readily transported by human and animal activity. The seeds can easily attach to people's clothing, animal fur, off-road vehicles, mowers, tillers, and other equipment. This is one way they are transported to establish themselves in new areas. Pet owners are also acutely aware of the seed's potential to become lodged in an animal's nostrils, ears, and even penetrate the skin.

Current methods of controlling invasive weed species using mowers or weed whackers only compound the production of invasive grasses and other invasive weed species seasonally. Each year during fire season residents, county and state departments, and the forestry department set out to do fire clearance, usually targeting sites dominated by invasive grasses.

Early seasonal weed whacking while the grasses are still green only allows them to continue seed production later. Mowing or weed whacking late season when invasive grasses have died only disperses produced seeds compounding and spreading the population for next season.

Because these invasive plants are early seasonal germinators and go to seed before many native annuals have begun to bloom and produce seed, invasive can be knocked down by the proposed Invasive Weed Seed Removal System when no natives have produced seeds and only the natives are left to populate sites for the next season.

Numerous innovations for cutting the invasive weeds and grass have been provided in the prior art that art described as follows. Even though these innovations may be suitable for the specific individual purposes to which they address, they differ from the present design as hereinafter contrasted. The following is a summary of those prior patents most relevant to this application at hand, as well a description outlining the difference between the features of the Invasive Weed Seed Removal System and those of the prior art.

U.S. Pat. No. 4,722,139 of David Mahler describes a hand-held wild-seed reaping apparatus and method having a motor mounted on a frame for driving a cutting mechanism which is surrounded by a containment box with an open front and rear end. A cutting collector attached to the open rear end of the containment box is provided to retain cut seed which has been selected by the user for harvesting and which is removably attached to the frame of the invention. As a result, users can harvest seed wherever walking is possible, even in steep, rocky or brushy territory. Further, they are enabled to be very selective in cutting, therefore harvesting only selected species and avoiding unwanted species.

This patent describes a hand-held wild-seed reaping apparatus that operates similar to a standard weed eater with a string or wire as a cutting means. It does not use a horizontal cutting blade with the height adjustable supporting means and could not be used in an enlarged version to be towed by a tractor for road side cuttings.

U.S. Pat. No. 6,665,941 of Robert A. Teeple describes a weed cutter having a protective housing with an air impeller, an air diverter and a motor driven rotary cutter element. The air impeller creates a vacuum to effectively pull weeds into an inlet opening in the protective housing prior to contact with the cutter element and exhausting the debris through an exhaust outlet.

This patent describes a weed cutter having a protective housing with an air impeller apparatus that operates similar to a standard weed eater with a unique air impeller and diverter, but it does not use a horizontal cutting blade with the height adjustable supporting means and could not be used in an enlarged version to be towed by a tractor for road side cuttings.

U.S. Pat. No. 6,751,871 of Allen R, Furnish describes a cutting blade that is secured to the lower end of a flexible drive shaft. Drive shaft extends from the blade upwardly through a tubular handle. The upper end of the drive shaft is connected to the output of a drive motor. The cutting blade is within a housing having a bottom opening and three lower side openings. A cutting blade includes a pair of section vanes which when the cutting blade is rotating serve to pull air into the housing through the lower sidewall openings. The moving air picks up the cuttings and moves them rearwardly into a cuttings bag which is connected to and supported from a rear portion of the housing.

This patent describes a cutting blade that is secured to the lower end of a flexible drive shaft that operates similar to a standard weed eater.

U.S. Pat. No. 5,862,595 of Stephen Timothy Keane describes a hand-hold able trimmer for garden and lawn applications has an elongated housing defining an air passage extending from the trimmer's rotating trimmer head to a collection container for cuttings mounted distally on the housing. An impeller wheel driven by the trimmer motor causes air to flow under positive pressure from the region surrounding the trimmer head through the housing air passage to eventually deliver the trimmer cuttings to the collection container. A dual, axially adjustable trimmer head assembly also is provided to more efficiently cut grass, weeds, etc. into small pieces capable of being easily transferred to the collection container.

This patent describes a hand-held trimmer for garden and lawn applications that has an elongated housing defining an air passage extending from the trimmer's rotating trimmer head to a collection container. This patent involves a cutting blade that is secured to the lower end of a flexible drive shaft that operates similar to a standard weed eater with the addition of a vacuum collection means.

U.S. Pat. No. 8,256,120 of Phillip S. Million et al. describes a vegetation trimmer having a motor with a motor output shaft, a cutting head for cutting vegetation, and a gear mechanism for transmitting power from said motor output shaft to the cutting head. The motor output shaft has a gear mechanism with a pinion wheel and a fan mounted thereon. The gear mechanism further comprises an internal gear wheel engaging with the pinion wheel and connected to the cutting head, whereby the cutting head rotates in the same direction as the fan does during operation of the motor.

This patent describes a vegetation trimmer having a motor with a motor output shaft, a cutting head for cutting vegetation, and a gear mechanism for transmitting power that operates similar to a standard weed eater. It could not be used in an enlarged version to be towed by a tractor for road side cuttings.

U.S. Pat. No. 5,588,289 of Graham J. Wilson describes a cutting tool for use in the garden and workshops having a body which houses a screw impeller that can be driven by a motor. The screw impeller being arranged to move waste along a flow path extending through the body from an inlet to an outlet, the outlet being connectable to a receptacle which can then entrap any material so moved. A rotating cutting blade controlled by the screw impeller being located adjacent to the inlet to act with a fixed cutting blade to cut material projecting therebetween, which cut material is entrained through the body by the screw impeller to the receptacle.

This patent describes a hand held cutting tool for use in the garden and workshops having a body which houses a screw impeller that can be driven by a motor but does not have the unique features of the Invasive Weed Seed Removal System.

U.S. Pat. No. 5,372,002 of Douglas R. Collicutt describes a hand-held apparatus is disclosed for collecting seeds from plants. The apparatus has an elongated handle with a rotary brush-like unit rotatably attached to one end of the handle. The rotary unit has a plurality of seed stripper elements extending radially outwardly from and operatively spaced around the unit. Drive means are provided for rotating the unit and seed containment means are attached to the handle and extend adjacent the unit for catching seed which is stripped off the plants by the seed stripper elements. A conventional string trimmer may be converted into a seed stripper of the invention by removing the string trimmer head and replacing it with the rotary unit of the invention.

This patent describes a hand-held apparatus that discloses the collected seeds from plants. The apparatus has an elongated handle with a rotary brush-like unit attached to one end. It does not have the capability of controlled height adjustment or being used in a variety of differing sizes due to the fact that larger sizes would be too heavy to be hand held.

U.S. Pat. No. 8,914,981 of Bruce A. Paez describes a weed cutter with vacuum that includes a removable cover, a cylindrical chamber attachable to the cover, an intake column fastened endwise to the chamber opposite the cover, with a vacuum impeller disposed within the chamber, a motor disposed distally within the intake column, which motor engages a cutting blade pivotally mounted at a distal end of the intake column, wherein debris created at the cutting blade is drawn into the cylindrical chamber and captured in a filter column disposed therein.

This patent describes a small weed cutter with a vacuum made to be hand held and used in small areas.

U.S. Pat. No. 4,964,472 of Marianne Cleworth describes a weed remover for eradicating, killing, collecting and dispensing weeds without the user having to touch the soil or weeds, wherein the invention comprises a frame, a handle, a foot bar, a digging blade, a vacuum inlet tube, a vacuum blower, an outlet hose, and a weed collecting housing secured to frame. A weed disposal bag is secured to the weed collecting housing and tubes provide a track for weeds to be sucked into a disposable weed bag by vacuum generated from an electric motor. A battery charger is provided as well as a tank for weed killer or other fluids and delivery tubing is provided for delivering the weed killer to soil near the severed weed root.

This patent describes a weed remover for eradicating, killing, collecting and dispensing weeds without the user having to touch the soil or weeds. It operates on a spade type of action where a cutter is inserted into the location of a single weed and a weed killer is injected into the soil to kill the root. It and the others do not have the unique characteristics of the invasive Weed Seed Removal System.

In this respect, before explaining at least one embodiment of the Invasive Weed Seed Removal System in detail it is to be understood that the design is not limited in its application to the details of construction and to the arrangement of the components set forth in the following description or illustrated in the drawings. The Invasive Weed Seed Removal System is capable of other embodiments and of being practiced and carried out in various ways. Also, it is to be understood that the phraseology and terminology employed herein are for the purpose of description and should not be regarded as limiting.

SUMMARY OF THE INVENTION

The principle advantage of the Invasive Weed Seed Removal System is that it will eliminate the seeds produced by unwanted vegetation to reduce or eliminate future seed germination of such undesirable species.

Another advantage of the invasive Weed Seed Removal System is that it can be adjusted to varying heights to just cut the early sprouting seed pods of the invasive plants.

And another advantage of the Invasive Weed Seed Removal System is that its basic design can be manufactured in a variety of different useful configurations and sizes, including hand-held units, backpack units, weed whacker type units, and large equipment driven units, for both residential and commercial use.

And another advantage of the Invasive Weed Seed Removal System is the unique method of controlling and eliminating those threats that have a large impact on the natural environment.

And another advantage of the Invasive Weed Seed Removal System is that it can be used for harvesting desirable grass seeds.

And another advantage of the Invasive Weed Seed Removal System is when the seeds from the undesirable plants have been removed, the area does not need to be cut as often.

And another advantage of the Invasive Weed Seed Removal System is it can be easily changed to different heights for the cutting process with the adjustable flexible rotating skids.

And another advantage is with the adjustable flexible rotating skids the Invasive Weed Seed Removal System can be moved over irregular surfaces easily.

And still another advantage of the Invasive Weed Seed Removal System is a compressor can be used to increase the air flow by the means of the venturi action taking the product into the receiving container.

A further advantage of the invasive Weed Seed Removal System is the reduction of invasive weeds along roadways which acts to prevent roadside fires from starting.

The preferred embodiment of the Invasive Weed Seed Removal System will consist of a back-pack unit containing a gas-powered vacuum with an additional drive connection to a flexible drive cable and a flexible vacuum hose connected to a rigid pipe section attached to the cutter and vacuum nozzle.

The first alternate embodiment of the Invasive Weed Seed Removal System will have the height adjustable rotatable skids that can be raised or lowered depending upon the height of the seed pods on the invasive plants.

The second alternate embodiment of the Invasive Weed Seed Removal System on height adjustable wheels is that it can be raised or lowered depending upon the height of the seed pods on the invasive plants and operates similar to a lawn mower.

The third alternate embodiment of the Invasive Weed Seed Removal System cutting, and vacuum nozzle powered by the means of a battery powered electric motor on a short handle rod with a pistol grip and the debris going into a removable fabric container.

The forth alternate embodiment being an enlarged Invasive Weed Seed Removal System used on a tractor for a road side application will have rock guards in front of the cutting blades and a debris channel tube to direct the material into a container bin at the back of the tractor.

With respect to the above description then, it is to be realized that the optimum dimensional relationships for the parts of the invasive Weed Seed Removal System, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present application. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of this application.

BRIEF DESCRIPTION OF THE DRAWINGS

The accompanying drawings, which are incorporated in and form a part of this specification, illustrate embodiments of the Invasive Weed Seed Removal System and together with the description, serve to explain the principles of this invention.

DETAILED DESCRIPTION OF THE PREFERRED EMBODIMENTS

Referring now to the drawings, wherein similar parts of the Invasive Weed Seed Removal System 10A, 10B, 10C, 10D and 10E are identified by like reference numerals.

Figure 1:
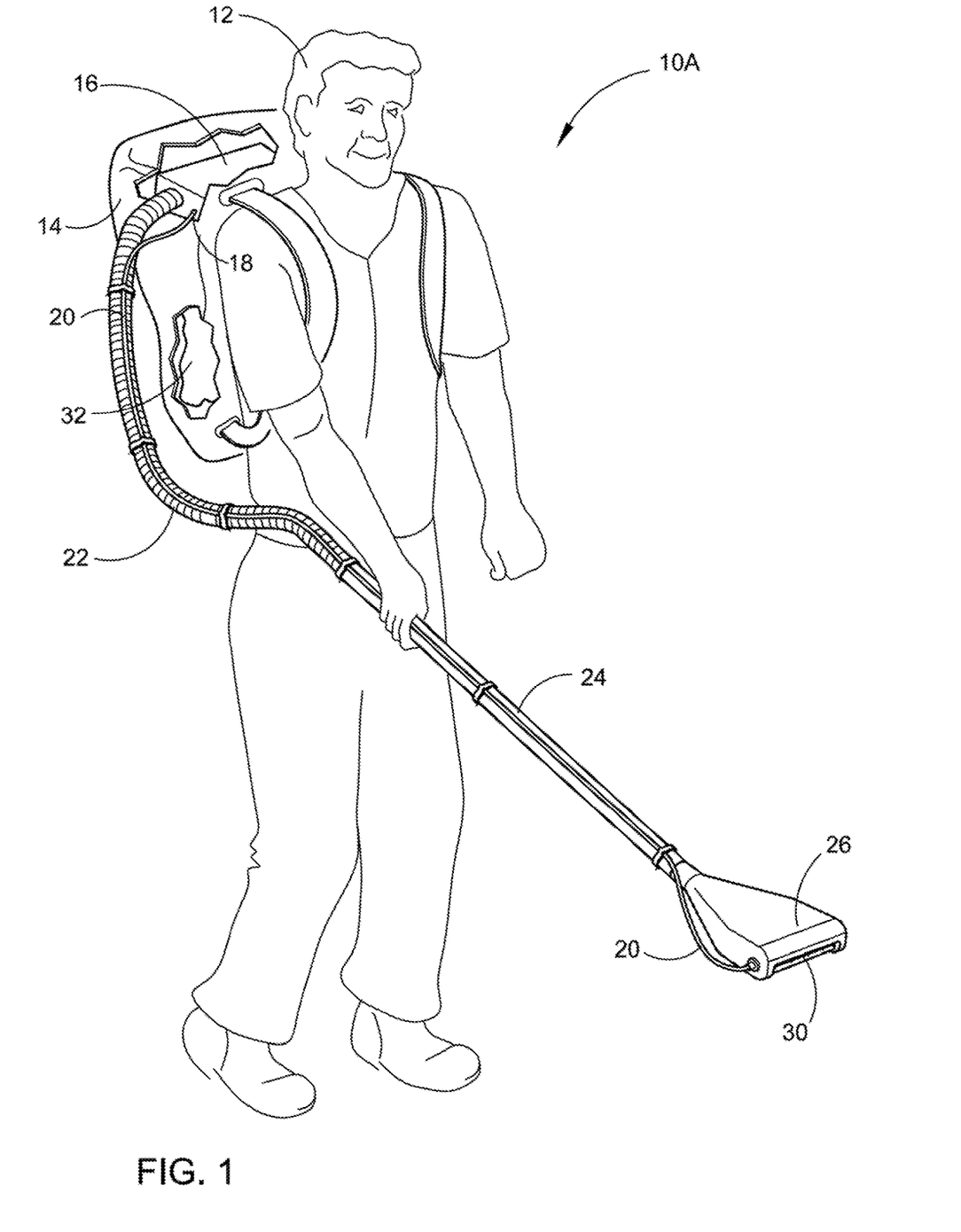
FIG. 1 depicts a person with the preferred embodiment of the Invasive Weed Seed Removal System consisting of a back-pack unit containing a gas-powered vacuum with an additional drive connection to a flexible drive cable and a flexible vacuum hose connected to a rigid pipe section attached to the cutter and vacuum nozzle.

FIG. 1 depicts a person 12 standing with the preferred embodiment of the invasive Weed Seed Removal System 10A consisting of a backpack unit 14 containing a gas-powered vacuum 16 with an additional drive connection 18 to a flexible drive cable 20 and a flexible vacuum hose 22 connected to a rigid pipe section 24 attached to the cutter and vacuum nozzle 26 with the cutting blades 30. Inside the backpack is a removable debris container 32 for the material sucked up by the gas-powered vacuum 16.

Figure 2:
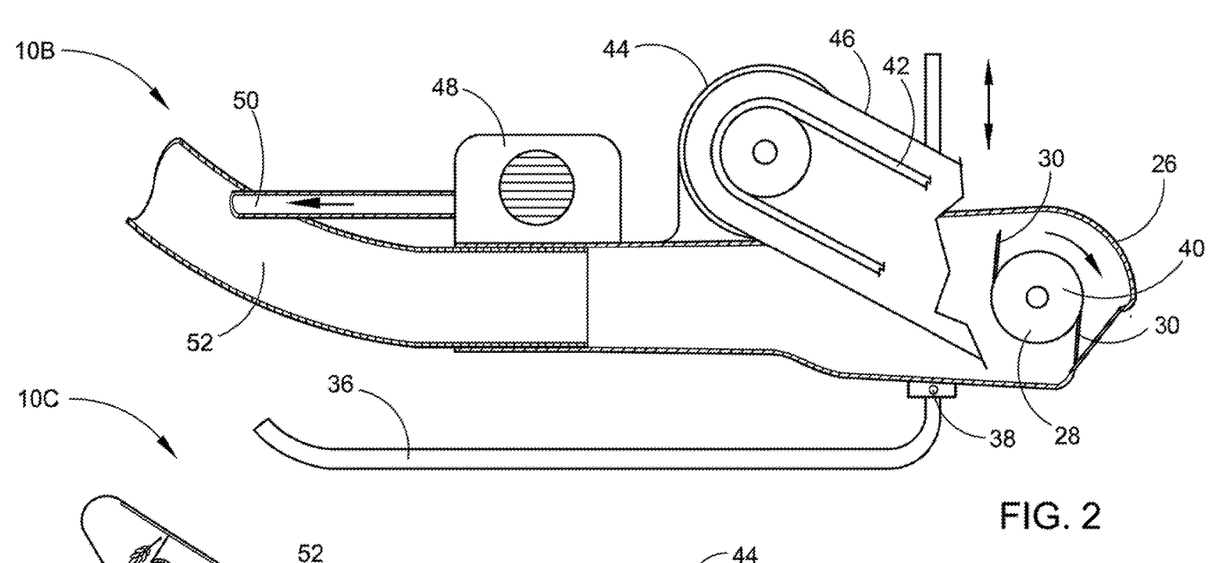
FIG. 2 depicts a cross section of the first alternate embodiment of the Invasive Weed Seed Removal System with the height adjustable rotatable skids.

FIG. 2 depicts a cross section of the first alternate embodiment of the Invasive Weed Seed Removal System 10B with the height adjustable rotatable skids 36 having the height adjustment clamping unit 38. The height adjustable skids 36 can be made from a strong plastic or metal with a plastic coating to keep them from creating a spark that might cause a fire. The cutting mechanism 40 will be a horizontal shaft 28 with two or more cutting blades 30 driven by the means of a pulley belt 42 connected to a gasoline or electric motor 44. The pulley belt will be housed within a pulley shroud 46. An optional air compressor 48 can be attached to the Invasive Weed Seed Removal System 10B with a venturi tube 50 to force fresh air into the debris channel 52 to increase the suction capabilities.

Figure 3:
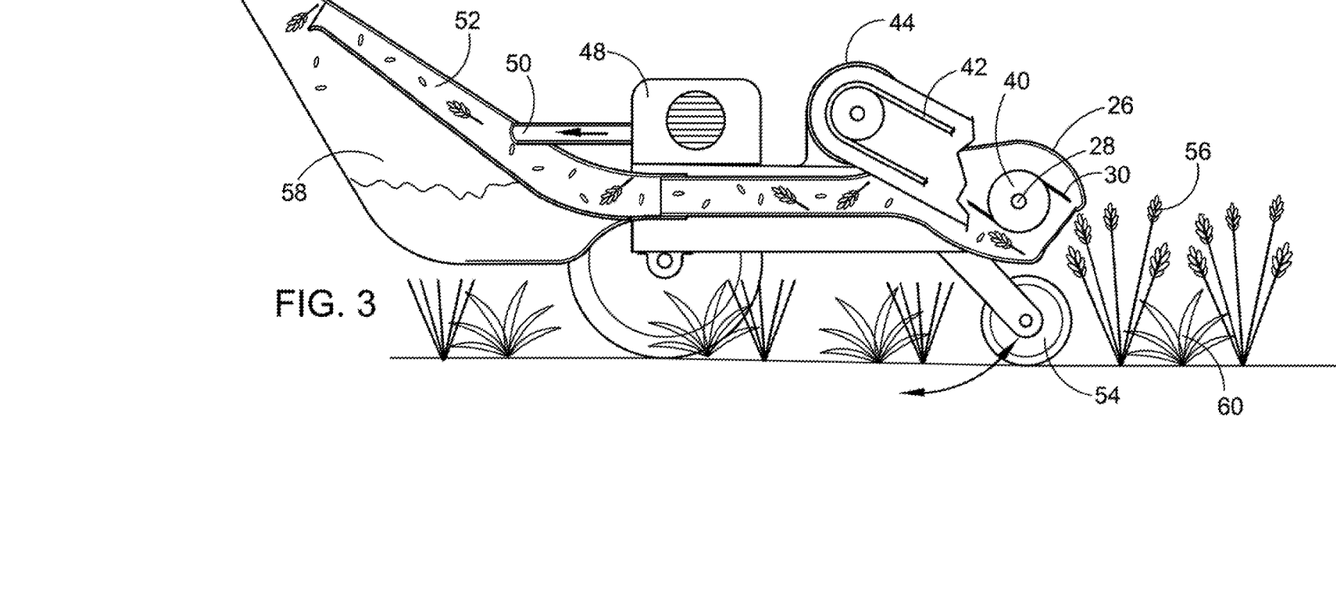
FIG. 3 depicts a cross section of the second alternate embodiment of the Invasive Weed Seed Removal System on height adjustable wheels similar to a lawn mower.

FIG. 3 depicts a cross section of the second alternate embodiment of the Invasive Weed Seed Removal System 10C on height adjustable wheels 56 similar to a lawn mower. The cutting mechanism 40 will be a horizontal shaft 28 with two or more cutting blades 30 driven by the means of a pulley belt 42 connected to a gasoline or electric motor 44. The pulley belt will be housed within a pulley shroud 46. An optional air compressor 48 can be attached to the Invasive Weed Seed Removal System 10B with a venturi tube 50 to force fresh air into the debris channel 52 to increase the suction capabilities. The front wheels 54 of the Invasive Weed Seed Removal System 10B can be rotated to change the height of the cutter and vacuum nozzle 26 depending upon the height of the seed pods 56 of the invasive weeds leaving the native plants 60 untouched. The debris will fall into a removable container 58 at the rear of the unit.

Figures 4, 5:
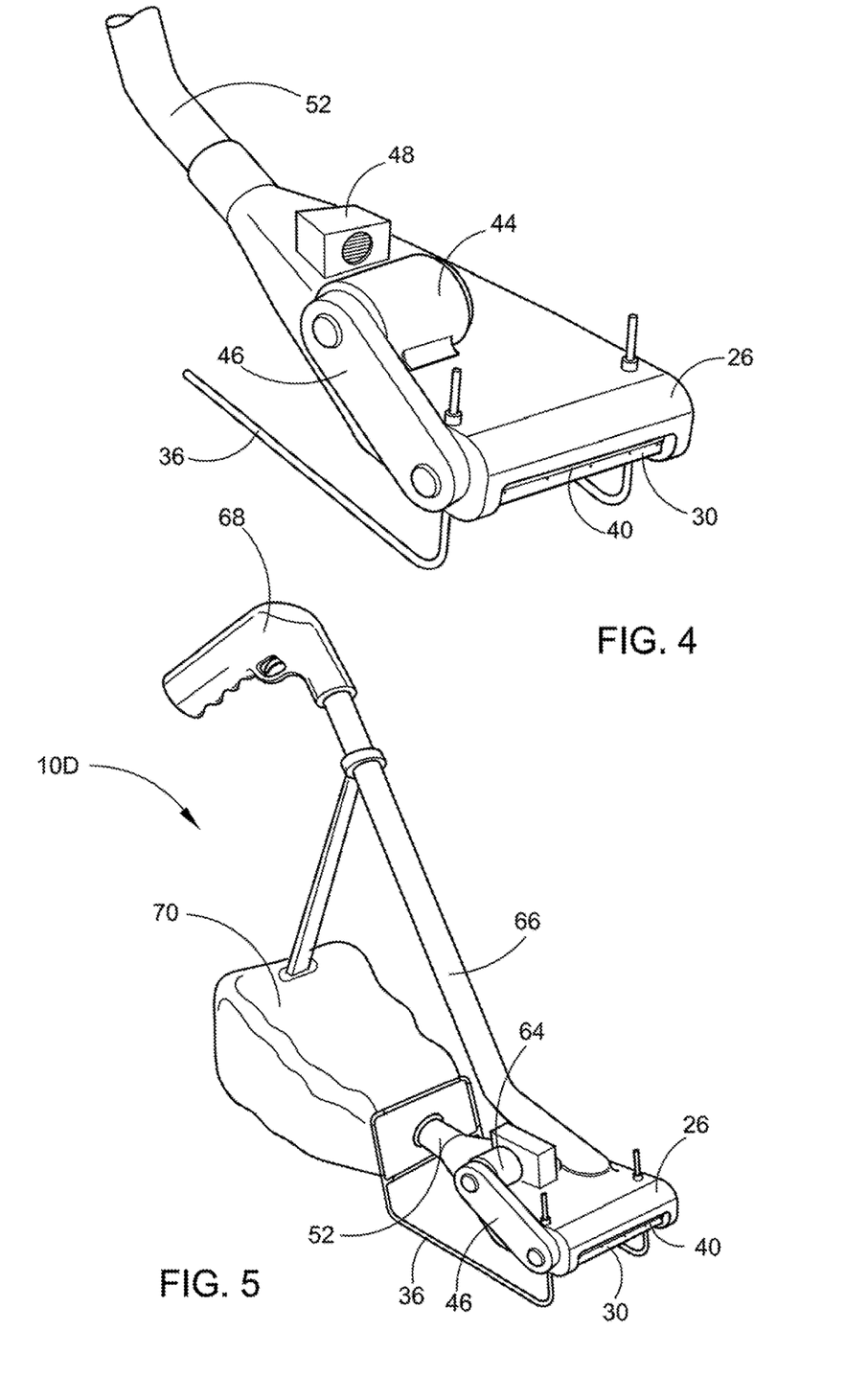
FIG. 4 depicts a perspective view of the cutting and vacuum nozzle of the first alternate embodiment of the Invasive Weed Seed Removal System.
FIG. 5 depicts a perspective view of the third alternate embodiment of the Invasive Weed Seed Removal System cutting and vacuum nozzle powered by the means of a battery powered electric motor on a short handle rod with a pistol grip and the debris going into a removable fabric container.

FIG. 4 depicts a perspective view of the cutting and vacuum head 26 of the first alternate embodiment of the Invasive Weed Seed Removal System 10B illustrating the height adjustable rotatable skids 36 that can be made from a strong plastic or metal with a plastic coating to keep them from creating a spark that might cause a fire. The cutting mechanism 40 will have two or more cutting blades 30 driven by a gasoline or electric motor 44. The pulley belt will be housed within a pulley shroud 46. An optional air compressor 48 can be attached to the Invasive Weed Seed Removal System 10B to increase the suction capabilities.

FIG. 5 depicts a perspective view of the third alternate embodiment of the Invasive Weed Seed Removal System 10D cutting and vacuum nozzle 26 by the means of a battery powered electric motor 64 on a short handle rod 66 with a pistol grip 68 and the debris going into a removable fabric container 70.

Figure 6:
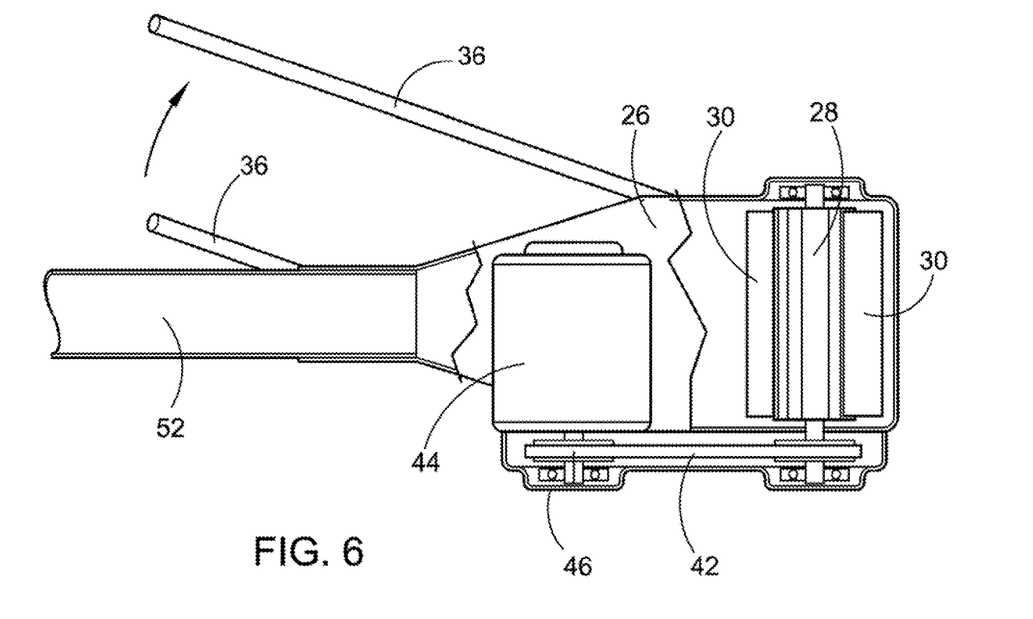
FIG. 6 depicts a top plan view of the cutting and vacuum head illustrating the pivoting action of the height adjustable rotatable skids.

FIG. 6 depicts a top plan view of the cutting and vacuum nozzle 26 illustrating the pivoting action of the height adjustable rotatable skids 36.

Figure 7:
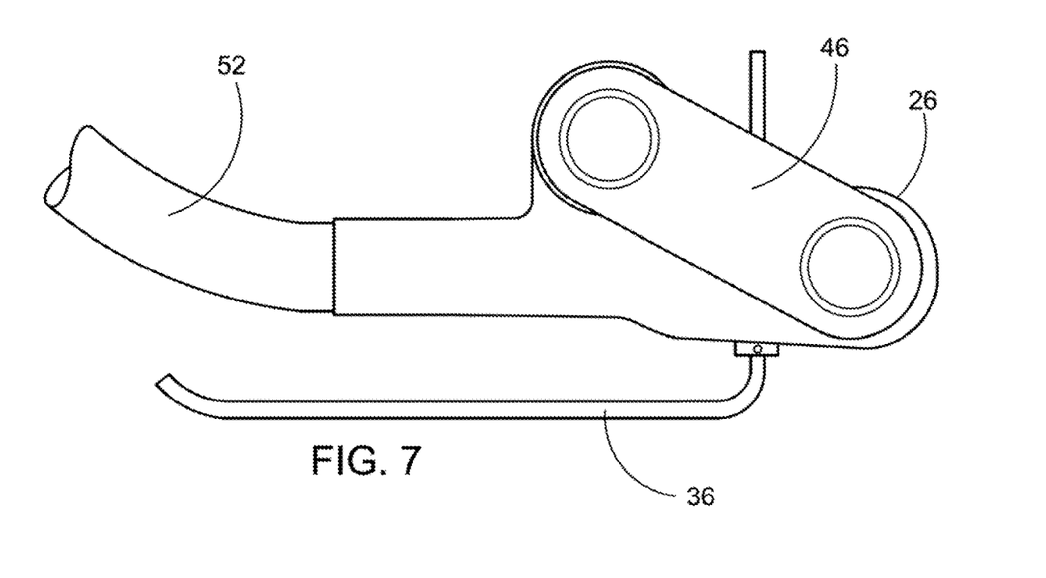
FIG. 7 depicts a side view of the cutting and vacuum nozzle of the first alternate embodiment of the Invasive Weed Seed Removal System.

FIG. 7 depicts a side view of the cutting and vacuum head 26 of the first alternate embodiment of the Invasive Weed Seed Removal System 10B illustrating the debris channel 52, the skids 36 and the pulley shroud 46.

Figure 8:
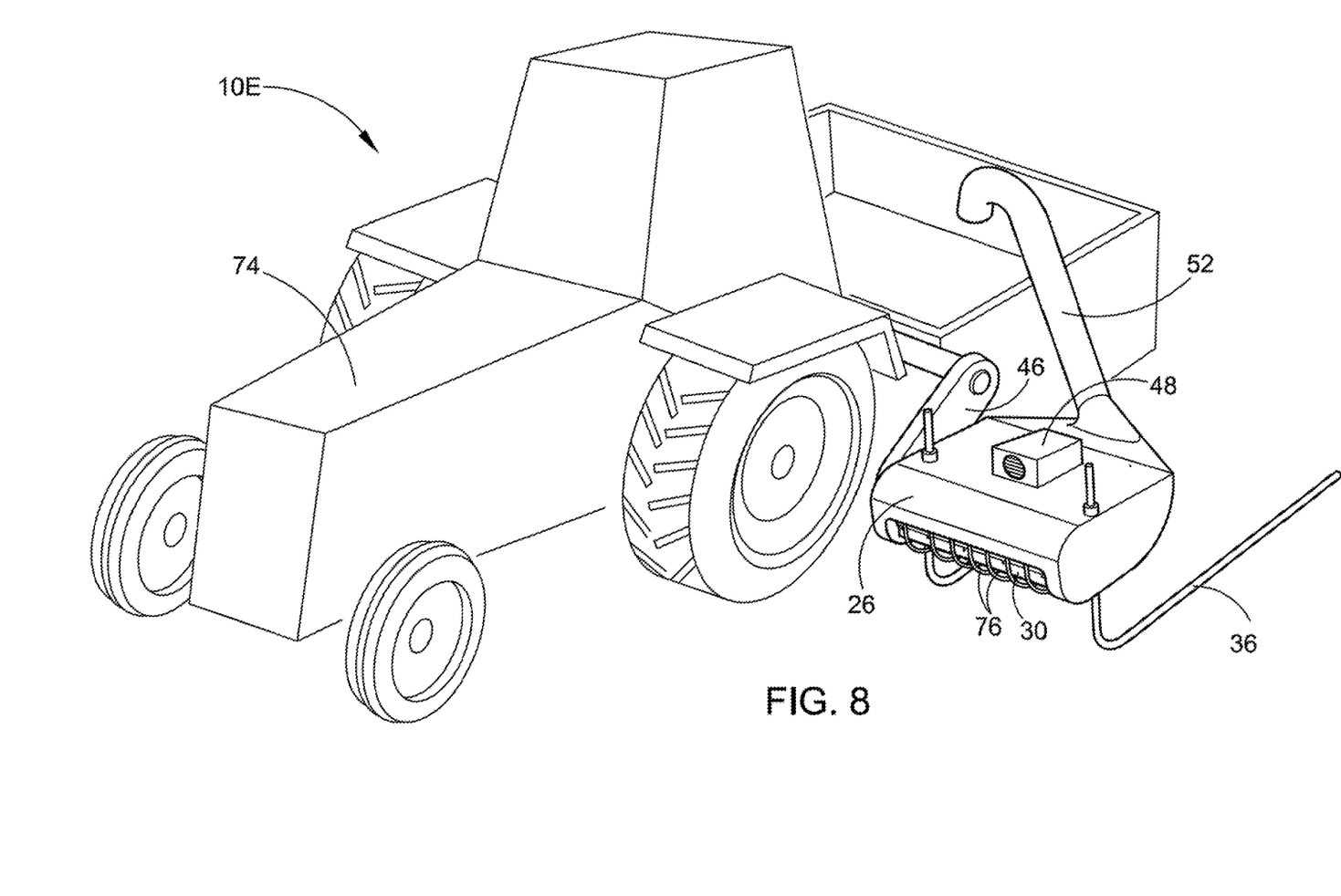
FIG. 8 depicts a perspective view of the forth alternate embodiment being an enlarged Invasive Weed Seed Removal System used on a tractor for a road side application with rock guards in front of the cutting blades.

FIG. 8 depicts a perspective view of an enlarged Invasive Weed Seed Removal System 10E used on a tractor 74 for a road side application with rock guards 76 in front of the cutting blades 30.

The Invasive Weed Seed Removal System 10A, 10B, 10C, 10D and 10E shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing an Invasive Weed Seed Removal System 10A, 10B, 10C, 10D and 10E in accordance with the spirit of this design, and such changes, alternations and modifications as would occur to those skilled in the art are considered to be within the scope of this application as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. An invasive weed seed removal system, comprising:
   (a) a portable unit including a flexible drive cable, a vacuum and an engine for powering said vacuum and for powering said flexible drive cable, a drive connection attached to said flexible drive cable for rotating said flexible drive cable when under power, and a flexible vacuum hose in communication with said vacuum to generate a vacuum effect when under power;
   (b) a rigid pipe section having an upper end and a lower end wherein said flexible vacuum hose is connected to said upper end of said rigid pipe section;
   (c) a cutter and vacuum nozzle connected to said lower end of said rigid pipe section, having a housing and cutting blades mounted on a horizontal shaft within said housing, and said horizontal shaft is rotatably attached to said flexible drive cable and driven to rotate by said drive cable, such that when the cutter blades mounted on said horizontal shaft rotate they act to cut and throw weed seed heads into said cutter and vacuum nozzle;
   (d) a removable debris container in communication with said vacuum for collection of the weed seed heads cut by said blades and vacuumed up by said vacuum; and
   (e) wherein said portable unit further includes a debris channel leading to said removable debris container, an air compressor having a venturi tube which acts to force air into said debris channel leading to said removable debris container in communication with said vacuum to increase the suction capabilities of said vacuum;
   wherein when said cutter blade is rotatably driven by said drive cable and the rotating action cuts weed seed heads and throws them into said cutter and vacuum nozzle, said vacuum sucks cut weed seed heads into said debris channel leading to said removable debris container, depositing the cut weed seed heads into said debris container, thereby removing weed seed heads from the environment.

2. The invasive weed seed removal system according to claim 1, wherein said cutter and vacuum nozzle housing further includes at least one height adjustable rotatable skid.

3. The invasive weed seed removal system according to claim 1, wherein said engine includes a gas-powered engine.

4. The invasive weed seed removal system according to claim 1, wherein said engine includes a battery powered or electric-powered engine.

5. The invasive weed seed removal system according to claim 1, wherein said portable unit is a self-contained hand-held portable unit.

6. The invasive weed seed removal system according to claim 1, wherein said portable unit is a self-contained backpack mounted portable unit.

7. The invasive weed seed removal system according to claim 1, wherein said portable unit is a self-contained lawn mower unit.

8. The invasive weed seed removal system according to claim 7, wherein said lawn mower unit includes front and rear wheels and said front wheels are height adjustable.

9. The invasive weed seed removal system according to claim 1, wherein said portable unit is a self-contained heavy equipment mountable unit.

10. The invasive weed seed removal system according to claim 1, wherein said portable unit does not include a flexible drive cable to drive said cutting blades and further includes a motor, and a pulley belt located within a pulley shroud mounted on said cutter and vacuum nozzle, wherein said pulley belt is attached to said motor and said cutting blades to drive said cutting blades.

11. A method for making an invasive weed seed removal system, comprising the steps of:
    (a) providing a portable unit including a flexible drive cable, a vacuum and an engine for powering said vacuum and for powering said flexible drive cable, having a drive connection to said flexible drive cable for rotating said flexible drive cable when under power, and a flexible vacuum hose in communication with said vacuum to generate a vacuum effect when under power;
    (b) providing a rigid pipe section having an upper end and a lower end wherein said flexible vacuum hose is connected to said upper end of said rigid pipe section;
    (c) providing a cutter and vacuum nozzle connected to said lower end of said rigid pipe section, having a housing and cutting blades mounted on a horizontal shaft within said housing, and said horizontal shaft is rotatably attached to said flexible drive cable and driven to rotate by said drive cable, such that when the cutter blades mounted on said horizontal shaft rotate they act to cut and throw weed seed heads into said cutter and vacuum nozzle;

(d) providing a removable debris container in communication with said vacuum for the collection of the weed seed heads cut by said blades and vacuumed up by said vacuum; and (e) providing said portable unit with a debris channel leading to said removable debris container, including an air compressor having a venturi tube which acts to force air into said debris channel leading to said removable debris container in communication with said vacuum to increase the suction capabilities of said vacuum;

wherein when said cutter blade is rotatably driven by said drive cable and the rotating action cuts weed seed heads and throws them into said cutter and vacuum nozzle, said vacuum sucks cut weed seed heads into said debris channel leading to said removable debris container, depositing the cut weed seed heads into said debris container, thereby removing weed seed heads from the environment.

12. The method of making an invasive weed seed removal system according to claim 11, wherein said cutter and vacuum nozzle housing further includes at least one height adjustable rotatable skid.

13. The method of making an invasive weed seed removal system according to claim 11, wherein said engine includes a gas-powered engine.

14. The method of making an invasive weed seed removal system according to claim 11, wherein said engine includes a battery powered or electric-powered engine.

15. The method of making an invasive weed seed removal system according to claim 11, wherein said portable unit is a self-contained hand-held portable unit.

16. The method of making an invasive weed seed removal system according to claim 11, wherein said portable unit is a self-contained backpack mounted portable unit.

17. The method of making an invasive weed seed removal system according to claim 11, wherein said portable unit is a self-contained lawn mower unit.

18. The method of making an invasive weed seed removal system according to claim 17, wherein said lawn mower unit includes front and rear wheels and said front wheels are height adjustable.

19. The method of making an invasive weed seed removal system according to claim 11, wherein said portable unit is a self-contained heavy equipment mountable unit.

20. The method of making an invasive weed seed removal system according to 11, wherein said portable unit does not include a flexible drive cable to drive said cutting blades and further includes a motor and a pulley belt located within a pulley shroud mounted on said cutter and vacuum nozzle, wherein said pulley belt is attached to said motor and said cutting blades to drive said cutting blades.

* * * * *